(12) United States Patent
Albertson et al.

(10) Patent No.: US 11,184,354 B2
(45) Date of Patent: Nov. 23, 2021

(54) NETWORK-BASED AUTHORIZATION FOR DISCONNECTED DEVICES

(71) Applicant: International Business Machines Corporation, Armonk, NY (US)

(72) Inventors: Chad Albertson, Rochester, MN (US); David G. Wheeler, Rochester, MN (US); Scott D. Frei, Rochester, MN (US); Mark S. Fredrickson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 16/361,357

(22) Filed: Mar. 22, 2019

(65) Prior Publication Data
US 2020/0304495 A1 Sep. 24, 2020

(51) Int. Cl.
*H04L 29/06* (2006.01)

(52) U.S. Cl.
CPC ........ *H04L 63/0853* (2013.01); *H04L 63/105* (2013.01); *H04L 63/107* (2013.01); *H04L 63/20* (2013.01)

(58) Field of Classification Search
CPC .. H04L 63/0853; H04L 63/105; H04L 63/107
USPC .......................................................... 726/1
See application file for complete search history.

(56) References Cited

U.S. PATENT DOCUMENTS

| | | | |
|---|---|---|---|
| 8,863,256 B1 | 10/2014 | Addepalli et al. | |
| 9,369,471 B2* | 6/2016 | Zent | ...................... H04L 63/104 |
| 9,407,633 B2 | 8/2016 | Gill et al. | |
| 9,461,983 B2 | 10/2016 | Banerjee et al. | |
| 9,917,825 B1 | 3/2018 | Casillas et al. | |
| 10,097,538 B1 | 10/2018 | Sanchez | |
| 2011/0082767 A1 | 4/2011 | Ryu et al. | |
| 2016/0050259 A1 | 2/2016 | Banerjee et al. | |
| 2018/0309760 A1 | 10/2018 | Arasavelli et al. | |
| 2018/0349892 A1 | 12/2018 | Lattanzio et al. | |
| 2018/0375849 A1* | 12/2018 | Koskimies | ............ H04L 9/3228 |

\* cited by examiner

*Primary Examiner* — Anthony D Brown
(74) *Attorney, Agent, or Firm* — Patterson + Sheridan, LLP

(57) ABSTRACT

Techniques for enhanced security for disconnected devices are provided. A request for one or more attributes of a security component is received by the security component, from a requesting device. The one or more attributes are provided to the requesting device, where the requesting device transmits the one or more attributes to a network service, where the security component is not able to communicate with the network service. A token is received from the requesting device, where the requesting device received the token in response to transmitting the one or more attributes to the network service. A level of access is determined for the requesting device, based on validating the token using a predefined configuration of the security component. Finally, the determined level of access is provided to the requesting device.

20 Claims, 7 Drawing Sheets

NETWORK-BASED AUTHORIZATION FOR DISCONNECTED DEVICES

BACKGROUND

The present disclosure relates to user authorization, and more specifically, to providing network-based authorization for devices that are disconnected from the network.

A large number of systems and devices are accessible via ports or connections that have little or no security. For example, it is typically relatively easy to access and change the content displayed by electronic road signs, simply by gaining physical access to the sign. As these signs are typically located in public locations, gaining such access is not difficult. Attempts have been made to secure these devices using physical means (e.g., a lock and key) or software security (e.g., a required password). However, these security measures are easily bypassed (e.g., if a physical key is lost or duplicated, or a password is too simple or is known to unauthorized users). Further, these security measures are static and difficult to reconfigure (e.g., requiring replacement of the lock). Moreover, because these devices rarely have network access (e.g., to the Internet), such reconfiguration typically requires physical presence at the device.

SUMMARY

According to one embodiment of the present disclosure, a method is provided. The method includes receiving, by a security component, from a requesting device, a request for one or more attributes of the security component. The method further includes providing, to the requesting device, the one or more attributes, wherein the requesting device transmits the one or more attributes to a network service, wherein the security component is not able to communicate with the network service. Additionally, the method includes receiving, from the requesting device, a token, wherein the requesting device received the token in response to transmitting the one or more attributes to the network service. The method then includes determining a level of access for the requesting device, based on validating the token using a predefined configuration of the security component, and providing the determined level of access to the requesting device.

According to a second embodiment of the present disclosures, a computer-readable storage medium is provided. The computer-readable storage medium has computer-readable program code embodied therewith, which is executable by one or more computer processors to perform an operation. The operation includes receiving, by a security component, from a requesting device, a request for one or more attributes of the security component. The operation further includes providing, to the requesting device, the one or more attributes, wherein the requesting device transmits the one or more attributes to a network service, wherein the security component is not able to communicate with the network service because the security component lacks Internet connectivity. Additionally, the operation includes receiving, from the requesting device, a token, wherein the requesting device received the token in response to transmitting the one or more attributes to the network service. The operation then includes determining a level of access for the requesting device, based on validating the token using a predefined configuration of the security component, and providing the determined level of access to the requesting device.

According to a third embodiment of the present disclosures, a system is provided. The system includes one or more computer processors, and a memory containing a program which when executed by the one or more computer processors performs an operation. The operation includes receiving, by a security component, from a requesting device, a request for one or more attributes of the security component. The operation further includes providing, to the requesting device, the one or more attributes, wherein the requesting device transmits the one or more attributes to a network service, wherein the security component is not able to communicate with the network service because the security component lacks Internet connectivity. Additionally, the operation includes receiving, from the requesting device, a token, wherein the requesting device received the token in response to transmitting the one or more attributes to the network service. The operation then includes determining a level of access for the requesting device, based on validating the token using a predefined configuration of the security component, and providing the determined level of access to the requesting device.

DETAILED DESCRIPTION

Embodiments of the present disclosure enable enhanced security of otherwise unprotected (or under-protected) devices. In one embodiment, the enhanced security includes enabling multi-factor authentication of users or devices attempting to access the otherwise unsecured device. In some embodiments, the unsecured devices are disconnected from a wider network (e.g., the Internet). In embodiments, disconnected devices can rely only on their local storage (e.g., a predefined password or a list of authorized users), which requires cumbersome and time-consuming efforts to change (e.g., by traveling to the physical location of the device and updating the information). Further, because the device is disconnected, in embodiments, it is unable to utilize multi-factor or multi-step authentication. In embodiments of the present disclosure, security components are configured to enhance the security of disconnected devices (e.g., by enabling network-based authentication, multi-factor verification, and the like).

In one embodiment, the security component is similarly disconnected from a wider network such as the Internet. In an embodiment, the security component leverages the network connectivity of a requesting device (e.g., a laptop, a mobile telephone, a tablet, and the like) to access a network-based authentication service. In effect, in some embodiments, the security component forces the requesting device to authenticate itself, without requiring the security component or unsecured device to connect to any network or perform dynamic or complex validation. This allows the authorization parameters to be rapidly and easily changed (e.g., by modifying the configuration of the network service from any Internet-enabled device). In this way, embodiments of the present disclosure can improve the security of disconnected devices or systems.

Figure 1:
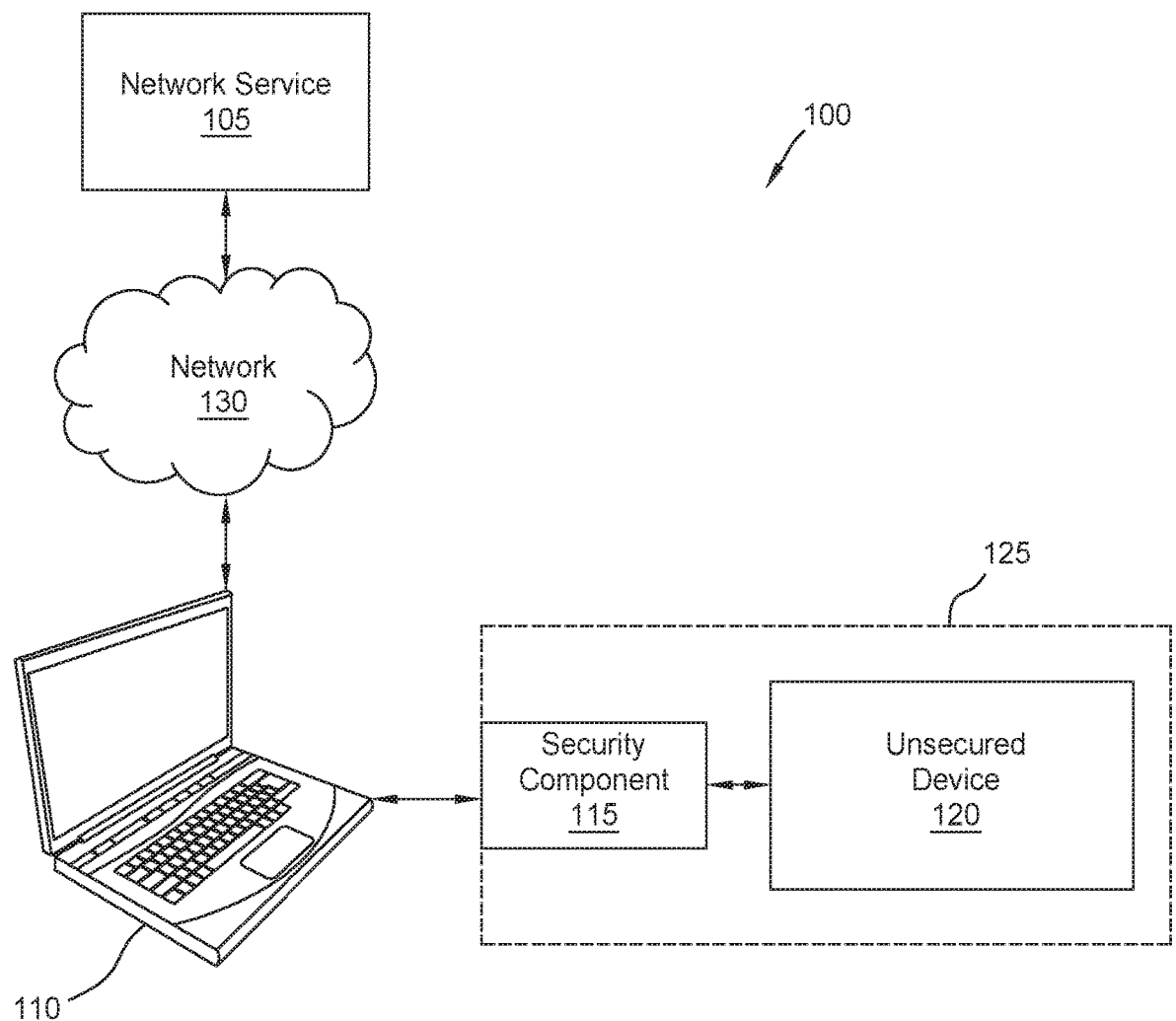
FIG. 1 illustrates an environment including a security component, an unsecured device, a requesting device, and a network service, according to one embodiment disclosed herein.

FIG. 1 illustrates an environment 100 including a Security Component 115, an Unsecured Device 120, a Requesting Device 110, and a Network Service 105, according to one embodiment disclosed herein. In the illustrated embodiment, the Requesting Device 110 is communicatively coupled with the Network Service 105 via a Network 130 (e.g., the Internet). In one embodiment, the Network Service 105 is implemented as a cloud-based service that can be used to authenticate the Requesting Device 110 and enable access to the Unsecured Device 120. Notably, in the illustrated embodiment, both the Security Component 115 and Unsecured Device 120 are disconnected from the Network 130 and Network Service 105. That is, the Security Component 115 and Unsecured Device 120 cannot access the Network Service 105 to perform validation or authentication.

In embodiments, the Unsecured Device 120 can include any electronic device or system. Although in some embodiments the Unsecured Device 120 is entirely unsecured (e.g., with no physical or programmatic security), in embodiments, the Unsecured Device 120 can also be any device that is partially secured or is entirely secured. For example, in one embodiment, the Unsecured Device 120 has a physical lock or cover, and/or requires a password to enable access. In some embodiments, however, the Unsecured Device 120 is not sufficiently secured, in that it does not (or cannot) use multi-factor authentication, that its security is relatively static and time-consuming or costly to update, and the like.

In various embodiments, the Unsecured Device 120 may be, for example, an electronic or digital sign (e.g., accessible through an otherwise unsecured RS232 port), a vehicle (e.g., where the onboard software is accessible via an otherwise unsecured OBD-II port), and the like. In the illustrated embodiment, the Security Component 115 interfaces with the Unsecured Device 120 in order to create a Secure System 125. In one embodiment, the Security Component 115 is a discrete device or component that connects to the port(s) provided by the Unsecured Device 120, in order to prevent them from being accessed by other devices. In one embodiment, the Security Component 115 can be locked or otherwise secured to the Unsecured Device 120 (e.g., within a secure container that encompasses both) such that users cannot gain access to the unsecured port of the Unsecured Device 120. In some embodiments, the Security Component 115 can instead be implemented via software or hardware within the Unsecured Device 120. Regardless, in an embodiment, after installation, the Unsecured Device 120 is only accessible via the Security Component 115.

In the illustrated embodiment, in order to access the Unsecured Device 120 (e.g., in order to change the text on a sign), the Requesting Device 110 interfaces with the Security Component 115. In embodiments, this connection may be wired or wireless (e.g., via a short-range wireless communication technique). In one embodiment, this connection is made via the same type of port or plug originally used by the Unsecured Device 120, such that a given Requesting Device 110 can interface with protected Secure Systems 125 as well as unprotected Unsecured Devices 120 (e.g., devices which have not yet been updated with a Security Component 115). In an embodiment, when the Requesting Device 110 connects to the Security Component 115, the Security Component 115 blocks access to the Unsecured Device 120, and provides a set of attributes to the Requesting Device 110.

In embodiments, the set of attributes can include, for example, an identifier (e.g., serial number) of the Security Component 115, a location of the Security Component 115 (e.g., as determined via a global positioning system (GPS)), a current timestamp, vendor information (e.g., an identifier for the manufacturer or vendor of the Security Component 115), and the like. In one embodiment, the Security Component 115 forwards similar identifying information of the Unsecured Device 120. In some embodiments, the Requesting Device 110 uses these attributes to authenticate itself and generate a token for accessing the Secured System 125. For example, in one embodiment, the Security Component 115 maintains one or more secret keys, which are known to authorized entities but are otherwise unknown.

In embodiments, the Requesting Device 110 must provide a token to the Security Component 115 in order to access the Unsecured Device 120. In one embodiment, the Security Component 115 encrypts its secret key(s) using an encryption algorithm, and compares the encrypted result to the received token. If they do not match, in an embodiment, the Security Component 115 denies the connection request. In embodiments, to generate this token, the attributes received from the Security Component 115 are used to identify the corresponding secret key(s). For example, in one embodiment, the Requesting Device 110, if it is an authorized device, has access to a database (locally or through the Network 130) that indicates the secret key(s) for each Security Component 115. In such an embodiment, the Requesting Device 110 can similarly encrypt the key(s) using the known or indicated encryption algorithm(s), and provide the token to the Security Component 115 to authenticate itself.

In some embodiments, the Requesting Device 110 does not have access to the secret keys, and instead forwards one or more of the received attributes to the Network Service 105. In one embodiment, the Requesting Device 110 identifies the appropriate Network Service 105 based on the indicated vendor information for the Security Component 115. In the illustrated embodiment, the Network Service 105 can then authenticate the Requesting Device 110 based on a variety of factors. If the authentication is successful, the Network Service 105 retrieves the corresponding secret key for the Security Component 115, encrypts it to generate a token, and passes the token to the Requesting Device 110.

In one embodiment, authorizing the Requesting Device 110 includes identifying a set of rules that define authorized use of the Unsecured Deice 120. For example, in an embodiment, one such rule may include determining whether the request is received during an authorized time or day. That is, access may be permitted during certain times, but forbidden during others. In one embodiment, the Network Service 105 determines the current location of the Security Component 115, and determines whether the Security Component 115 is currently within a predefined authorized area (e.g., a state, county, or other defined area). If not, the Network Service 105 can deny access.

In some embodiments, the Network Service 105 requires the Requesting Device 110 to identify itself (e.g., via its media access control or MAC address). Similarly, in an embodiment, the Requesting Device 110 can require the user of the Requesting Device 110 to provide credentials (e.g., a username and password). In such an embodiment, the Requesting Device 110 can determine whether the identified Requesting Device 110 and/or user are authorized to access the Secure System 125 (e.g., based on a predefined whitelist). In some embodiments, the Requesting Device 110 can further require additional authentication such as biometric data (e.g., from a fingerprint reader), voice authentication, and the like.

In one embodiment, the Network Service 105 transmits an indication of the connection attempt to one or more authorized users or devices, and requests approval prior to providing the token. That is, in one embodiment, the Network Service 105 transmits a text message, email, or other communication to one or more predefined accounts, telephones, or devices (e.g., controlled by the owner of the Secure System 125), and requests approval. For example, if the Secure System 125 is a vehicle and the Requesting Device 110 is being used by a mechanic, the Network Service 105 can provide, to the owner or operator of the vehicle, the identity of the mechanic and/or Requesting Device 110, the time and location of the request, and the like. In some embodiments, the Network Service 105 further indicates the scope of the request (e.g., whether the user is requesting write access or only read access, or what portion(s) of the Unsecured Device 120 the user is requesting access to). Based on this indication, the authorized user (who may or may not be the same user using the Requesting Device 110) can remotely approve or decline the connection.

In some embodiments, to install or configure the Security Component 115, a user (e.g., the owner or operator of the Unsecured Device 120) installs the Security Component 115 such that it blocks or otherwise prevents unauthorized access to the Unsecured Device 120 (e.g., by plugging/locking the Security Component 115 into the Unsecured Device 120). In an embodiment, the user can then access the Network Service 105 via any network-enabled device, and configure the rules to be used. For example, the authorized user log in to a user account on the Network Service 105, and register the Security Component 115 (e.g., via serial number) to the account. In embodiments, the user can then configure the rules that are used to determine whether a connection request is authorized. For example, this configuration can include defining, for each possible scope or type of access, an authorized geographical area, whether manual approval is required, an authorized time, authorized users or Requesting Devices 110, and the like.

Thus, in embodiments of the present disclosure, the authorized user(s) can remotely control access to the Unsecured Device 120, using the Security Component 115 and Network Service 105. This control improves security by providing for dynamic and network-based authentication, rather than static passwords or locks. Additionally, even if the Security Component 115 and Unsecured Device 120 are entirely disconnected from the Network 130 (e.g., because of location or because of their physical configuration), the user can still modify the connection rules simply by accessing the Network Service 105. Thus, when connection attempts are made, the access is allowed or denied based on the most up-to-date configuration possible, even if the Secure System 125 itself has not been modified or updated.

In one embodiment, the Requesting Device 110 makes the authentication request to the Network Service 105 upon connecting to the Security Component 115 and receiving the attribute(s). In one embodiment, if the attributes (e.g., the serial number of the Security Component 115) are known to the user, the Requesting Device 110 can pre-request an authorization token from the Network Service 105, even if it is not at the physical location of the Secure System 125. For example, suppose the Secure System 125 is located in a remote location with poor or no cellular service. In an embodiment, the user can look up the identity of the Security Component 115 (e.g., in a database maintained by the owner or operator of the Secure System 125), and use the Requesting Device 110 to request a token. In an embodiment, if such remote authorization is permitted by the configuration maintained by the Network Service 105, the Requesting Device 110 receives a token that can later be used to access the Unsecured Device 120.

Figure 2:
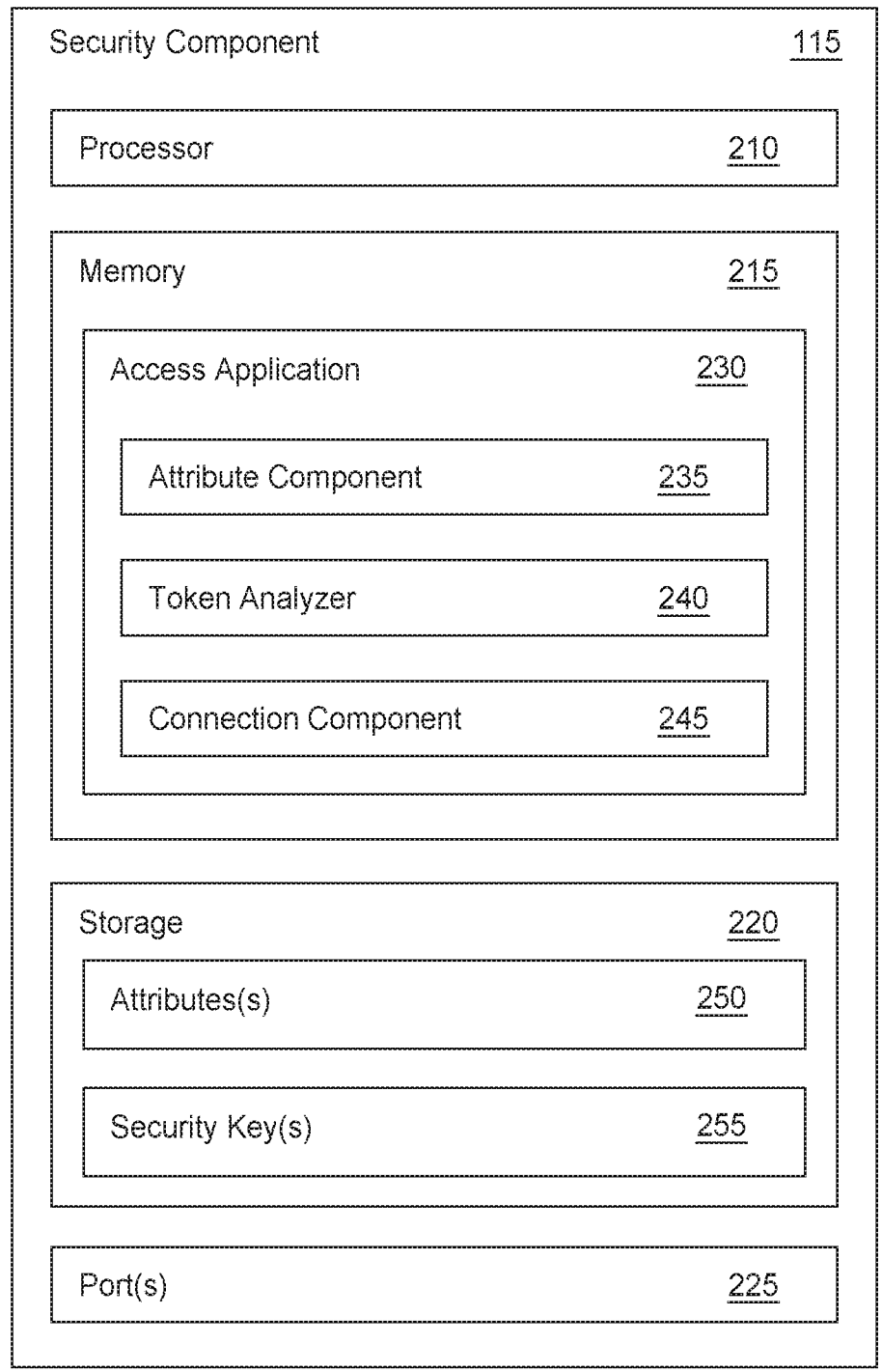
FIG. 2 is a block diagram illustrating a security component, according to one embodiment disclosed herein.

FIG. 2 is a block diagram illustrating a Security Component 115, according to one embodiment disclosed herein. In the illustrated embodiment, the Security Component 115 is a discrete component that can be installed proximate to an Unsecured Device 120 to create a Secure System 125. In some embodiments, however, the Security Component 115 is implemented directly on or by the Unsecured Device 120 (e.g., using one or more software or hardware components). In the illustrated embodiment, the Security Component 115 includes a Processor 210, a Memory 215, Storage 220, and one or more Ports 225. In the illustrated embodiment, Processor 210 retrieves and executes programming instructions stored in Memory 215 as well as stores and retrieves application data residing in Storage 220. Processor 210 is representative of a single CPU, multiple CPUs, a single CPU having multiple processing cores, and the like. Memory 215 is generally included to be representative of a random access memory. Storage 220 may be a disk drive or flash-based storage device, and may include fixed and/or removable storage devices, such as fixed disk drives, removable memory cards, or optical storage, network attached storage (NAS), or storage area-network (SAN).

In an embodiment, via the Ports 225, the Security Component 115 can be communicatively coupled with one or more other devices including Unsecured Devices 120, Requesting Devices 110, and the like. In some embodiments, one or more of the Ports 225 are physical ports (e.g., RS232 ports, OBD-II ports, and the like). In one embodiment, the Security Component 115 includes two complementary Ports 225. For example, in such an embodiment the Security Component 115 can include a male port of a particular type for connection to a female port of an Unsecured Device 120, as well as a female port of the same type for connection to a Requesting Device 110 (e.g., to fill the role of the female port of the Unsecured Device 120). In some embodiments, the Security Component 115 includes one or more wireless Ports 225. In one embodiment, these wireless Ports 225 use short-range communication techniques (e.g., WiFi, Bluetooth, or near-field communications) to interact with Requesting Devices 110 and/or Unsecured Devices 120.

In one embodiment, the Security Component 115 uses a physical port to connect to an Unsecured Device 120, and provides a wireless interface for interaction with Requesting Devices 110. In such an embodiment, in addition to providing increased security for the Unsecured Device 120, the Security Component 115 can also enable increased functionality by providing a wireless interface that allows users to interact with the Unsecured Device 120 without physically connecting to it. In some embodiments, although the Security Component 115 includes ports capable of connecting to Unsecured Devices 120 and Requesting Devices 110 through physical or short-range wireless communication, the Security Component 115 does not include long-range connectivity (e.g., cellular connectivity). Thus, in an embodiment, the Requesting Device 110 must use its own connectivity to authenticate itself, which allows the Security Component 115 (and Unsecured Device 120) to enforce security protocols while being disconnected from broader networks (such as the Internet).

In the illustrated embodiment, the Storage 220 includes a set of Attributes 250, and a set of Security Keys 255. Although illustrated as residing in Storage 220, in embodiments, the Attributes 250 and Security Keys 255 may be stored in any appropriate location. In an embodiment, the Attributes 250 define characteristics of the Security Component 115 and/or Unsecured Device 120. For example, in embodiments, the Attributes 250 include a unique identifier (e.g., a serial number) of the Security Component 115 and/or Unsecured Device 120, vendor information for the Security Component 115 and/or Unsecured Device 120 to which it is connected, and the like. In the illustrated embodiment, the Security Keys(s) 255 are secret keys maintained by the Security Component 115 to determine whether to allow access to an Unsecured Device 120 (and, in some embodiments, what type of access to provide).

In one embodiment, the Security Component 115 maintains a separate Security Key 255 for each type or scope of access. For example, the Security Component 115 may maintain a first key for read-only access, and a second key for ready/write access. As another example, the Security Component 115 can maintain a first Security Key 255 for access to a first operation or action implemented by the Unsecured Device 120 (e.g., changing the brightness of an electronic road sign), and a second key for other actions (such as changing the text displayed by the sign). In some embodiments, when a Security Component 115 is installed and configured with a particular Unsecured Device 120, the user defines the scope provided by each Security Key 255.

In an embodiment, the Security Component 115 maintains these Security Keys 255 in secret, and does not share them with Requesting Devices 110. In one embodiment, when the Security Component 115 receives a security token from a Requesting Device 110, the Security Component 115 encrypts each Security Key 255 using one or more encryption algorithms, and compares each of the encrypted key(s) to the received token. If a match is found, the Security Component 115 determines the corresponding level access defined for the matching key, and provides it to the Requesting Device 110. That is, in an embodiment, the Requesting Device 110 and/or Network Service 105 also maintain the set of Security Keys 255, and generate tokens by encrypting the key(s) with the defined encryption algorithms. Thus, in an embodiment where the Network Service 105 maintains the keys, the Requesting Devices 110 are not aware of the secret keys. That is, the keys are encrypted in the form of tokens when received from the Network Service 105, and are never transmitted by the Security Component 115.

In the illustrated embodiment, the Memory 215 includes an Access Application 230. Although illustrated as a program residing in Memory 215, in embodiments, the operations and functionality of the Access Application 230 can be implemented using hardware, software, or a combination of hardware and software. As illustrated, the Access Application 230 includes an Attribute Component 235, a Token Analyzer 240, and a Connection Component 245. Although depicted as discrete components for illustration, in embodiments, the functionality and operations of the Attribute Component 235, Token Analyzer 240, and Connection Component 245 can be combined or divided across any number of components.

In an embodiment, the Attribute Component 235 receives connection requests from Requesting Devices 110, and provides one or more Attributes 250 to the Requesting Device 110. In one embodiment, the Requesting Device 110 requests that the Security Component 115 identify itself and/or identify the Unsecured Device 120 (e.g., by returning the vendor information, serial number, and the like). In some embodiments, in addition to this identifying information, the Attribute Component 235 also includes attributes related to the request itself. For example, in embodiments, the Attribute Component 235 can return a time at which the request was received, a current location of the Security Component 115 (e.g., as determined using GPS), an identify of the Requesting Device 110, as indicated in the request, and the like. In some embodiments, the Attribute Component 235 packages these attributes such that the Requesting Device 110 can forward them to the Network Service 105. In one embodiment, the package of attributes is encrypted by the Attribute Component 235, such that only the Network Service 105 can ready or modify it.

In some embodiments, the Attribute Component 235 returns the identifying information for the Security Component 115 and/or Unsecured Device 120, and the Requesting Device 110 supplements this data with additional data (such as the time of the request, the location of the device, the identity of the Requesting Device 110, and the like). In an embodiment, the Requesting Device 110 then forwards these attributes to the Network Service 105, which returns a token if the authentication is completed successfully. The Requesting Device 110 then provides this token to the Access Application 230. In an embodiment, the Token Analyzer 240 receives this token, and authenticates it. In one embodiment, as discussed above, the token is generated by encrypting a secret key using one or more known encryption algorithms. In an embodiment, the Token Analyzer 240 validates or authenticates the token by decrypting it and comparing the result to the stored Security Keys 255. In an alternative embodiment, the Token Analyzer 240 encrypts the Security Keys 255 using the same encryption algorithm, and compares this result to the received token.

In the illustrated embodiment, if the Token Analyzer 240 determines that the received token is authentic/valid (e.g., because it matches a Security Key 255), the Connection Component 245 determines the level or scope of access that corresponds to the matching key. For example, in an embodiment, the Connection Component 245 utilizes a predefined configuration (e.g., specified when the Security Component 115 was installed/configured) to determine what access should be provided. The Connection Component 245 then provides this access to the Requesting Device 110. In this way, the Access Application 230 provides improved security, without requiring network connectivity.

Figure 3:
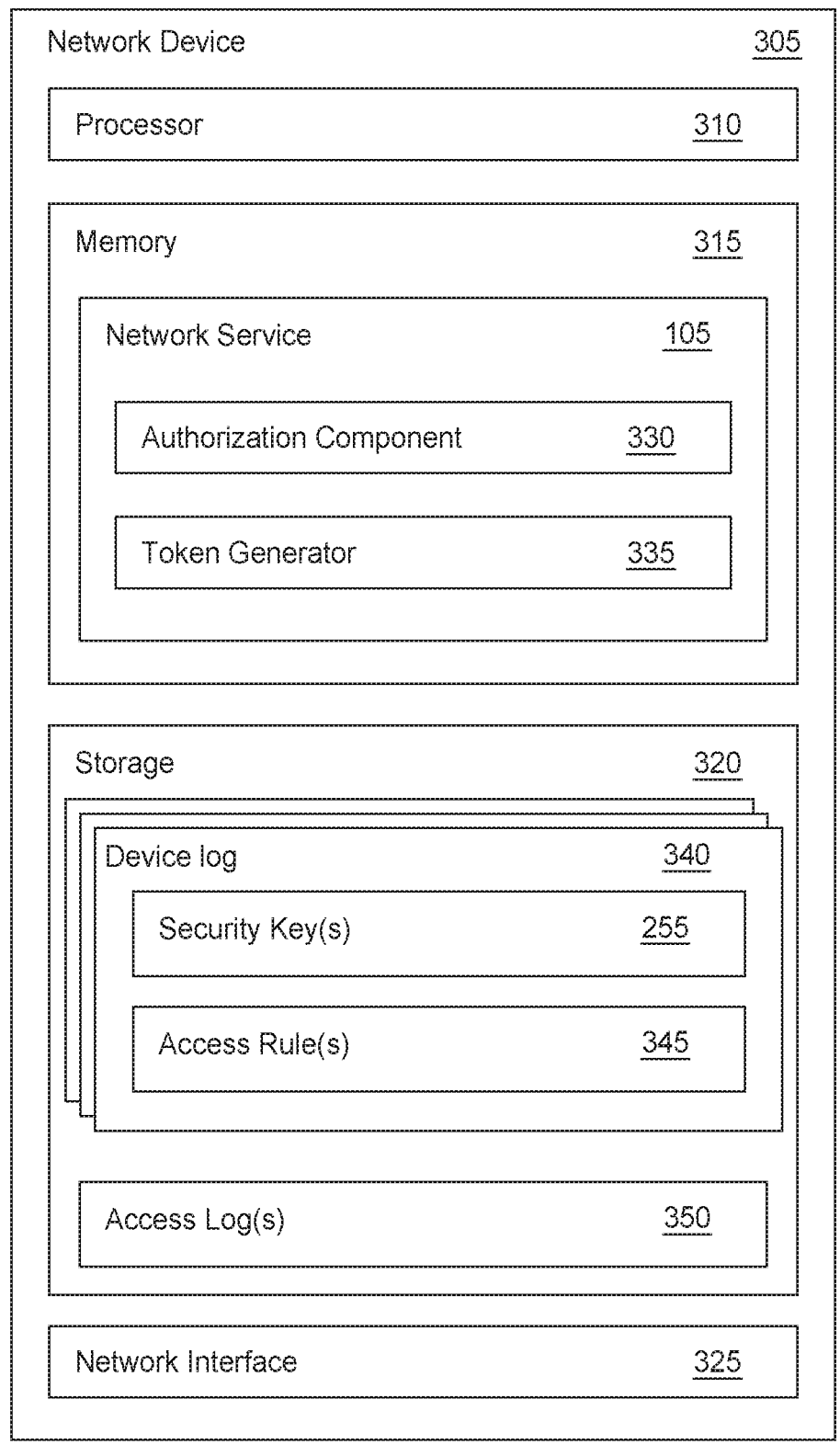
FIG. 3 is a block diagram illustrating a network device, according to one embodiment disclosed herein.

FIG. 3 is a block diagram illustrating a Network Device 305, according to one embodiment disclosed herein. In one embodiment, the Network Device 305 operates as part of a Cloud infrastructure. Further, although depicted as a single device, in embodiments, the operations and functionality of the Network Device 305 may be implemented in hardware, software, or a combination of both, and may be spread across any number of physical or virtual devices. As illustrated, the Network Device 305 includes a Processor 310, a Memory 315, Storage 320, and Network Interface 325. In the illustrated embodiment, Processor 310 retrieves and executes programming instructions stored in Memory 315 as well as stores and retrieves application data residing in Storage 320. Processor 310 is representative of a single CPU, multiple CPUs, a single CPU having multiple processing cores, and the like. Memory 315 is generally included to be representative of a random access memory. Storage 320 may be a disk drive or flash-based storage device, and may include fixed and/or removable storage devices, such as fixed disk drives, removable memory cards, or optical storage, network attached storage (NAS), or storage area-network (SAN). Through the Network Interface 325, the Network Device 305 can communicate with Requesting Devices 110, configuration devices, and the like.

In the illustrated embodiment, the Storage 320 includes a set of Device Logs 340, as well as a set of Access Logs 350. In an embodiment, each Device Log 340 corresponds to a particular Secure System 125 (e.g., a particular Security Component 115 and/or Unsecured Device 120). In an embodiment, when a Security Component 115 is installed/configured for an Unsecured Device 120, the user also accesses the Network Device 305 to create a corresponding Device Log 340. As illustrated, each Device Log 340 specifies one or more Security Keys 255, and one or more Access Rules 345. In an embodiment, each Security Key 255 matches a Security Key 255 used by the corresponding Security Component 115. In this way, when a Requesting Device 110 requests authentication, the Network Device 305 can generate an appropriate security token.

In an embodiment, each Access Rule 345 specifies a condition or requirement for a Requesting Device 110 to be granted access to the corresponding Security Component 115 and/or Unsecured Device 120. For example, in embodiments, the Access Rules 345 can include a type or identity of the Requesting Device 110 (e.g., using a whitelist of allowed devices), an identity or title of the user of the Requesting Device 110, a time or range of times and/or dates, a physical area the device must be in, a length of time during which access is permitted once the token is provided, and the like. In one embodiment, one or more Access Rules 345 can also specify that an identified user (or user device) should be informed of each request. In an embodiment, the rule may also specify that the request is not to be authorized until the user approves the connection. In some embodiments, each scope, type, or level of access is associated with corresponding Access Rules 345. In the illustrated embodiment, the Access Log 350 is maintained for all connection attempts, as discussed below in more detail.

As illustrated, the Memory 315 includes a Network Service 105, which includes an Authorization Component 330 and a Token Generator 335. In an embodiment, the Authorization Component 330 receives authorization requests from Requesting Devices 110. In embodiments, the authorization request can include any number of attributes, including the identify and/or vendor information for the Security Component 115 and/or Unsecured Device 120, the identity of the Requesting Device 110 and/or the user of the device, the time at which the request is being made (or at which time the connection is desired), the location of the Requesting Device 110 and/or Security Component 115, the type or scope of access requested, and the like.

In embodiments, the Authorization Component 330 identifies the relevant Security Component 115 for the request using these attributes, and retrieves the corresponding Device Log 340. The Authorization Component 330 can then determine, using the Access Rules 345, whether the requested connection should be authorized. If not, the Network Service 105 declines to provide a security token. In some embodiments, the Network Service 105 indicates, to the Requesting Device 110, the reason for the rejection. In an embodiment, if the Authorization Component 330 determines that the connection request is valid and should be authorized, the Token Generator 335 generates a security token and returns it to the Requesting Device 110. In one embodiment, generating the token includes identifying the Security Key 255 corresponding to the requested access, encrypting it, and returning this encrypted result.

In the illustrated embodiment, each time a connection request is received, the Network Service 105 records an indication of the request in the Access Log(s) 350. In embodiments, this can include storing, for example, the identity of the Requesting Device 110, Security Component 115, and/or Unsecured Device 120, the vendor of the Security Component 115, the time of the request, the location of the Security Component 115 and/or Requesting Device 110 when the request was made, whether the connection was approved, and the like. In this way, the owner or operator of the Secure System 125 can review the Access Logs 350 to determine who has accessed (or requested access) to the Unsecured Device 120, when and where the requests were made, and the like.

Figure 4:
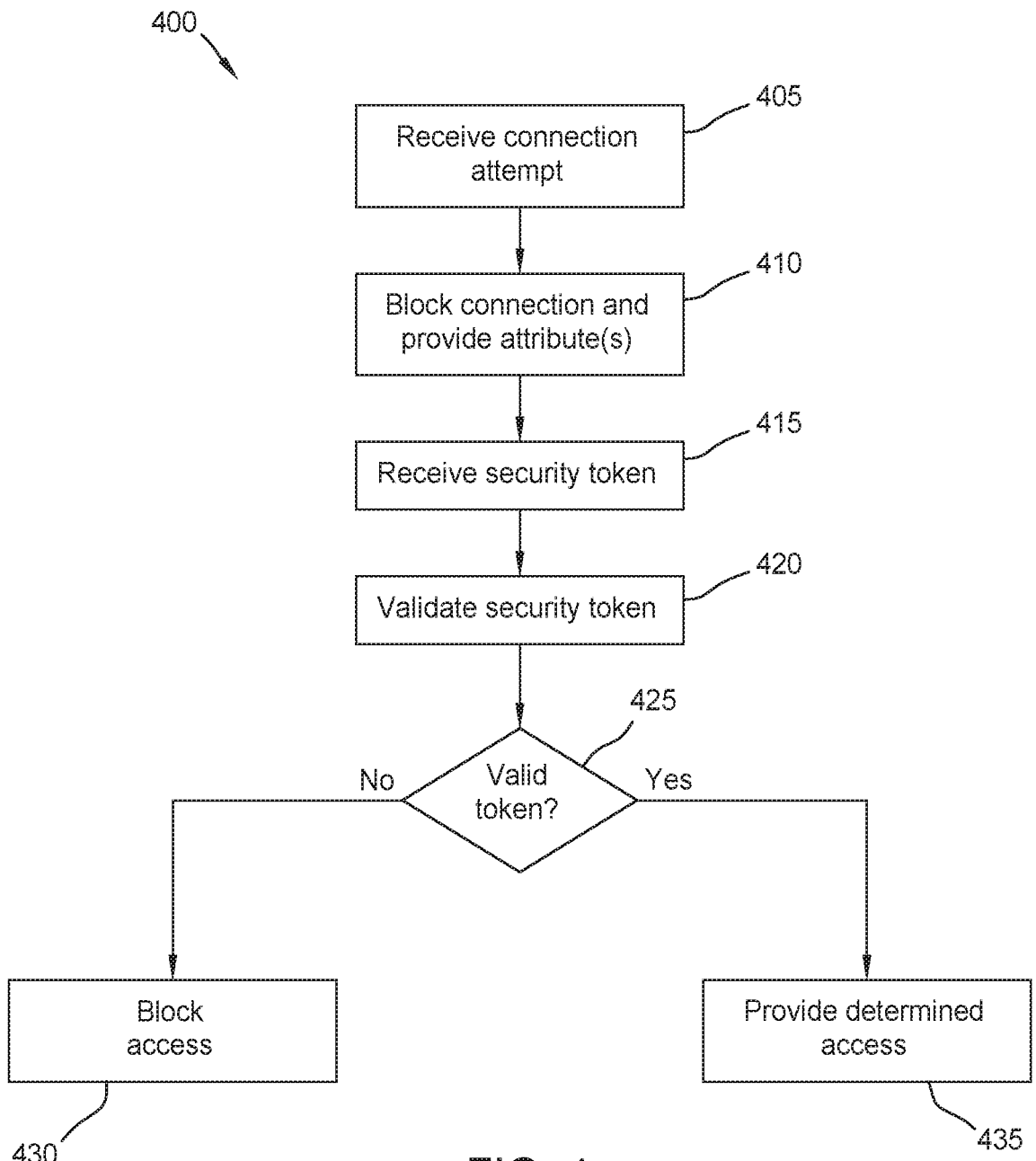
FIG. 4 is a flow diagram illustrating a method for enhancing security for disconnected and unsecured devices, according to one embodiment disclosed herein.

FIG. 4 is a flow diagram illustrating a method 400 for enhancing security for disconnected and unsecured devices, according to one embodiment disclosed herein. The method 400 begins at block 405, where a Security Component 115 receives a connection request or attempt (e.g., from a Requesting Device 110). At block 410, the Security Component 115 blocks or denies the connection, and returns one or more attributes, as discussed above. In embodiments, the Requesting Device 110 uses these attributes to request a security token from a Network Service 105. Subsequently, at block 415, the Security Component 115 receives such a token. The method 400 then proceeds to block 420, where the Security Component 115 validates the token.

In an embodiment, as discussed above, validating the token includes decrypting it to determine whether it matches with one of the stored Security Keys 255 the Security Component 115 uses. In another embodiment, validating the token includes encrypting each of the stored Security Keys 255, to determine whether this result matches the received token. The method 400 then continues to block 425, where the Security Component 115 determines whether the token is valid. If not, the method 400 proceeds to block 430, where the Security Component 115 continues to block the connection, such that the Requesting Device 110 cannot access the Unsecured Device 120. Alternatively, if the Security Component 115 determines that the token is valid, the method 400 proceeds to block 435, where the Security Component 115 determines the corresponding level of access (based on which key the token matched) and provides this connectivity to the Requesting Device 110 (e.g., by forwarding data between the Requesting Device 110 and the Unsecured Device 120).

Figure 5:
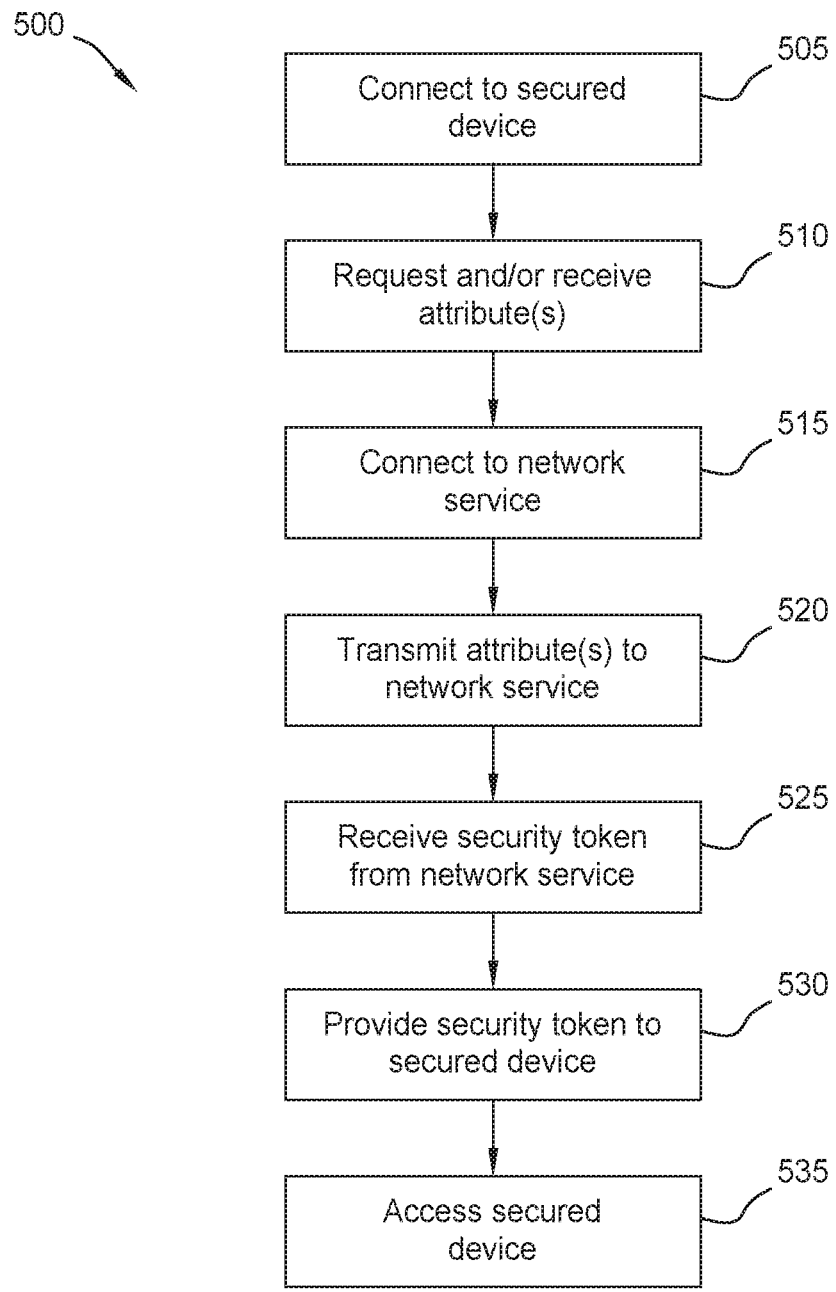
FIG. 5 is a flow diagram illustrating a method for accessing to disconnected secured devices, according to one embodiment disclosed herein.

FIG. 5 is a flow diagram illustrating a method 500 for accessing to disconnected secured devices, according to one embodiment disclosed herein. The method 500 begins at block 505, where a Requesting Device 110 connects to a secured device (e.g., a Secure System 125, or a Security Component 115 protecting an Unsecured Device 120). At block 510, the Requesting Device 110 requests and receives a set of attributes from the Security Component 115. The method 500 then proceeds to block 515, where the Requesting Device 110 connects to a Network Service 105. In one embodiment, the Requesting Device 110 identifies the appropriate Network Service 105 based on the identity of the Security Component 115 and/or the supplied vendor information.

At block 520, the Requesting Device 110 transmits the received attributes (e.g., the identifier of the Security Component 115) to the Network Service 105. In embodiments, the Requesting Device 110 can also transmit any other required attributes (such as the unique identifier of the Requesting Device 110, the user who is operating the Requesting Device 110, the time and place of the request, and the like). In some embodiments, upon determining that the corresponding Access Rules 345 require more information, the Network Service 105 can request this additional information. The method 500 continues to block 525, where the Requesting Device 110 receives a security token from the Network Service 105. Although not illustrated, in some embodiments, if the Requesting Device 110 receives a rejection, the Requesting Device 110 (or the user operating the device) can determine how to remedy the deficiency (if possible), and can request authentication a second time. The method 500 then proceeds to block 530, where the Requesting Device 110 provides this security token to the Security Component 115. Finally, if the token is valid, the Requesting Device 110 accesses the secured device (e.g., the Unsecured Device via the Security Component 115) at block 535.

Figure 6:
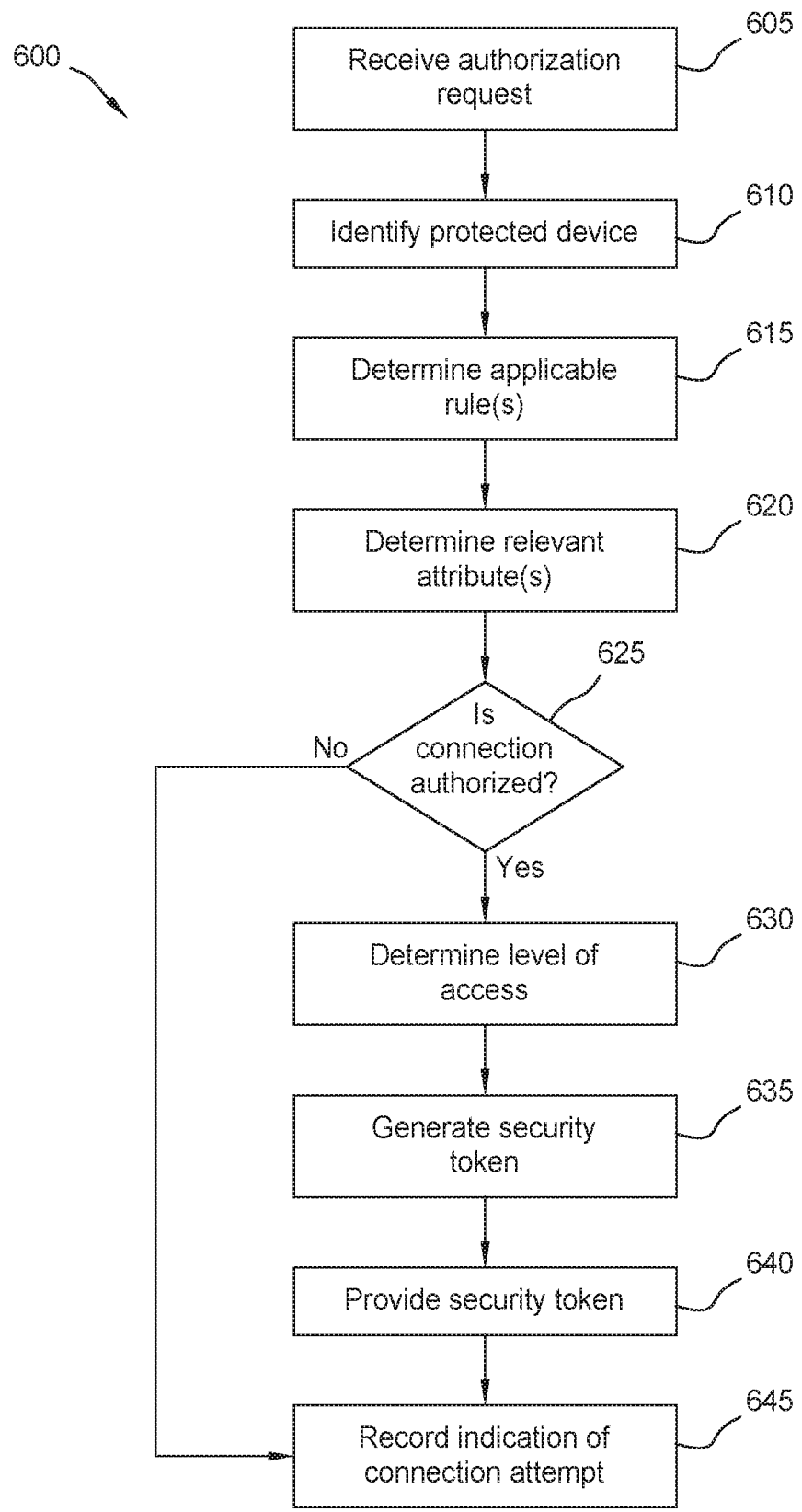
FIG. 6 is a flow diagram illustrating a method for authorizing access to a disconnected secured device, according to one embodiment disclosed herein.

FIG. 6 is a flow diagram illustrating a method 600 for authorizing access to a disconnected secured device, according to one embodiment disclosed herein. The method 600 begins at block 605, where a Network Service 105 receives an authorization request from a Requesting Device 110. At block 610, the Network Service 105 identifies the Unsecured Device 120 and/or Security Component 115 for which connectivity is desired. The method 600 then continues to block 615, where the Network Service 105 identifies the Access Rules 345 that are applicable for the identified device. Further, at block 620, the Network Service 105 determines values for each relevant attribute. For example, if one rule specifies that access is only permitted while the Secured System 125 is present within a defined geographic area, the Network Service 105 can determine a current location of the system. In embodiments, this can include identifying the relevant attribute in the request, and/or requesting additional information from the Requesting Device 110. The method 600 then proceeds to block 625.

At block 625, the Network Service 105 determines whether the connection should be authorized. In an embodiment, this includes determining whether the identified attributes align with or satisfy the determined access rules. In one embodiment, as discussed above, determining whether the connection should be authorized includes transmitting an indication of the connection request to one or more defined authorized users or devices, and awaiting approval. If the connection is not authorized, the method 600 proceeds to block 645, where the Network Service 105 records an indication of this attempt, for later review. Alternatively, if the connection is authorized, the method 600 continues to block 630, where the Network Service 105 determines what level or scope of access should be provided (e.g., based on the request). At block 635, the Network Service 105 generates a security token corresponding to this level of access. The method 600 then proceeds to block 640, where the Network Service 105 returns this security token to the Requesting Device 110. Finally, at block 645, the Network Service 105 records an indication of this (successful) connection attempt, for future review.

Figure 7:
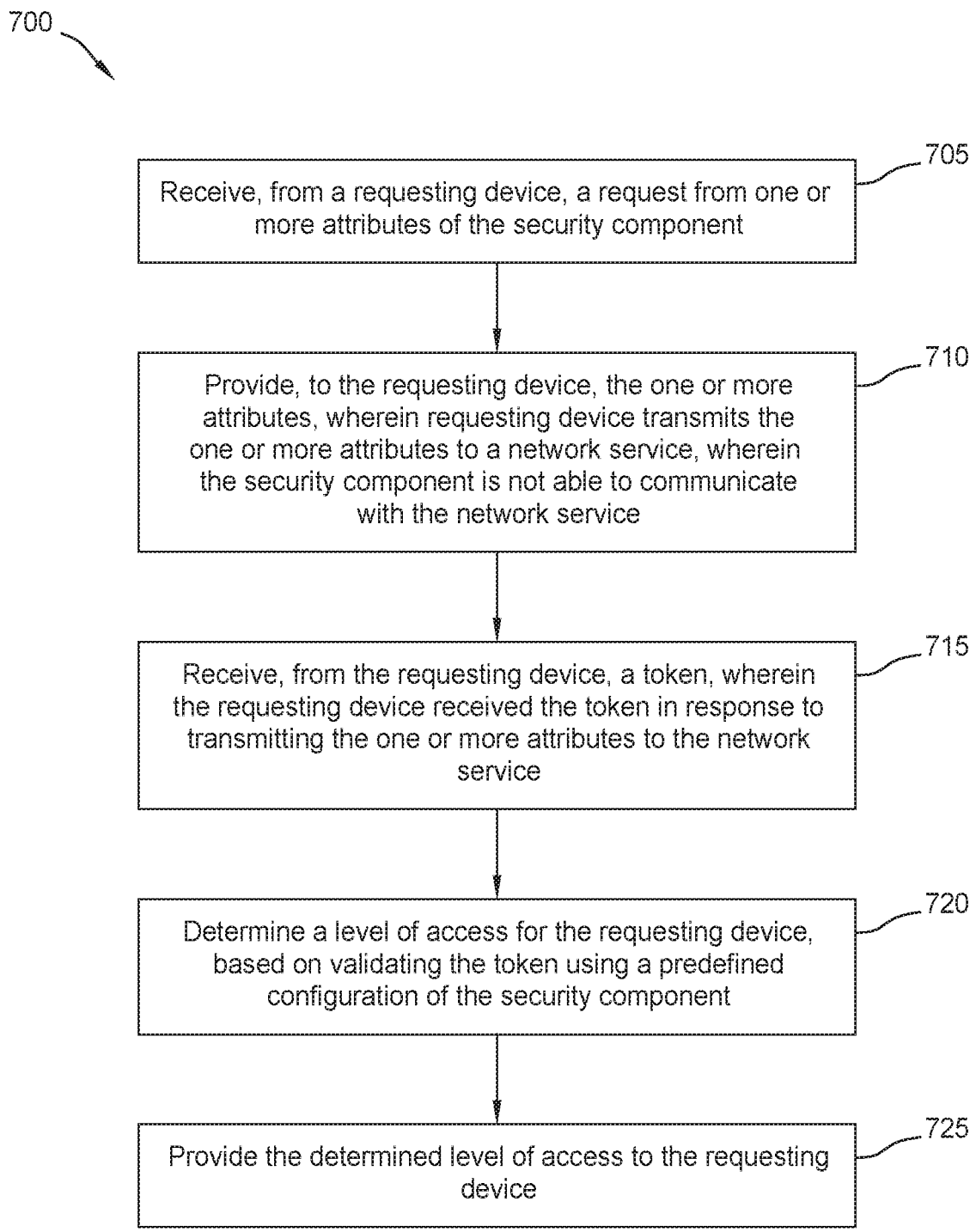
FIG. 7 is a flow diagram illustrating a method for enhancing security for unprotected and disconnected devices, according to one embodiment disclosed herein.

FIG. 7 is a flow diagram illustrating a method 700 for enhancing security for unprotected devices, according to one embodiment disclosed herein. The method 700 begins at block 705, where a Security Component 115 receives, from a requesting device, a request for one or more attributes of the Security Component 115. At block 710, the Security Component 115 provides, to the requesting device, the one or more attributes, wherein the requesting device transmits the one or more attributes to a network service, wherein the Security Component 115 is not able to communicate with the network service. The method 700 then proceeds to block 715, where the Security Component 115 receives, from the requesting device, a token, wherein the requesting device received the token in response to transmitting the one or more attributes to the network service. Additionally, at block 720, the Security Component 115 determines a level of access for the requesting device, based on validating the token using a predefined configuration of the Security Component 115. Finally, the method 700 continues to block 725, where the Security Component 115 provides the determined level of access to the requesting device.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Network Service 105) or related data available in the cloud. For example, the Network Service 105 could execute on a computing system in the cloud and authenticate connection requests. In such a case, the Network Service 105 could identify relevant access rules and authenticate requests, and store logs of connection attempts at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
receiving, by a security component, from a requesting device, a request for one or more attributes of the security component, wherein the security component controls access to a protected device;
providing, to the requesting device, the one or more attributes, wherein the one or more attributes include a unique identifier of the security component and a unique identifier of the protected device, wherein the requesting device transmits the one or more attributes to a network service, and wherein the security component is not able to communicate with the network service;
receiving, from the requesting device, a token, wherein the requesting device received the token in response to transmitting the one or more attributes to the network service, and wherein the token corresponds to an encrypted secret key associated with the security device;
determining a level of access, to the protected device, to provide for the requesting device based on validating the token using a predefined configuration of the security component; and
providing, to the requesting device, the determined level of access to the protected device.

2. The method of claim 1, wherein the security component is not able to communicate with the network service because the security component lacks Internet connectivity.

3. The method of claim 1, wherein providing the determined level of access to the requesting device comprises allowing the requesting device to access a protected device.

4. The method of claim 3, wherein the protected device is accessible via an unsecured port, and wherein the security component, when installed, is configured to prevent access to the unsecured port, such that the protected device is only accessible via the security component.

5. The method of claim 1, wherein providing, to the requesting device, the one or more attributes comprises determining a physical location of the security component using a global positioning system (GPS), wherein prior to providing the token to the requesting device, the network service determines whether the physical location is within a predefined acceptable area.

6. The method of claim 1, wherein prior to providing the token to the requesting device, the network service compares the one or more attributes to a set of rules associated with the security component.

7. The method of claim 6, wherein a first rule of the set of rules requires the network service to receive approval from an authorized user prior to providing the token.

8. The method of claim 1, wherein the network service records an indication of the transmission from the requesting device, wherein the indication includes: (i) an identity of the requesting device, (ii) an identity of a vendor of the security component, (iii) a serial number of the security component, (iv) a time at which the transmission was received by the network service, and (v) a physical location of the requesting device at the time of the transmission.

9. A computer-readable storage medium having computer-readable program code embodied therewith, the computer-readable program code executable by one or more computer processors to perform an operation comprising:
receiving, by a security component, from a requesting device, a request for one or more attributes of the security component, wherein the security component controls access to a protected device;
providing, to the requesting device, the one or more attributes, wherein the one or more attributes include a unique identifier of the security component and a unique identifier of the protected device, wherein the requesting device transmits the one or more attributes to a network service, and wherein the security component is not able to communicate with the network service because the security component lacks Internet connectivity;
receiving, from the requesting device, a token, wherein the requesting device received the token in response to transmitting the one or more attributes to the network service, and wherein the token corresponds to an encrypted secret key associated with the security device;
determining a level of access, to the protected device, to provide for the requesting device based on validating the token using a predefined configuration of the security component; and
providing, to the requesting device, the determined level of access to the protected device.

10. The computer-readable storage medium of claim 9, wherein providing the determined level of access to the requesting device comprises allowing the requesting device to access a protected device, wherein the protected device is accessible via an unsecured port, and wherein the security component, when installed, is configured to prevent access to the unsecured port, such that the protected device is only accessible via the security component.

11. The computer-readable storage medium of claim 9, wherein providing, to the requesting device, the one or more attributes comprises determining a physical location of the security component using a global positioning system (GPS), wherein prior to providing the token to the requesting device, the network service determines whether the physical location is within a predefined acceptable area.

12. The computer-readable storage medium of claim 9, wherein prior to providing the token to the requesting device, the network service compares the one or more attributes to a set of rules associated with the security component.

13. The computer-readable storage medium of claim 12, wherein a first rule of the set of rules requires the network service to receive approval from an authorized user prior to providing the token.

14. The computer-readable storage medium of claim 9, wherein the network service records an indication of the transmission from the requesting device, wherein the indication includes: (i) an identity of the requesting device, (ii) an identity of a vendor of the security component, (iii) a serial number of the security component, (iv) a time at which the transmission was received by the network service, and (v) a physical location of the requesting device at the time of the transmission.

15. A system comprising:
one or more computer processors; and
a memory containing a program which when executed by the one or more computer processors performs an operation, the operation comprising:
receiving, by a security component, from a requesting device, a request for one or more attributes of the security component, wherein the security component controls access to a protected device;
providing, to the requesting device, the one or more attributes, wherein the one or more attributes include a unique identifier of the security component and a unique identifier of the protected device, wherein the requesting device transmits the one or more attributes to a network service, and wherein the security component is not able to communicate with the network service because the security component lacks Internet connectivity;
receiving, from the requesting device, a token, wherein the requesting device received the token in response to transmitting the one or more attributes to the network service, and wherein the token corresponds to an encrypted secret key associated with the security device;
determining a level of access, to the protected device, to provide for the requesting device based on validating the token using a predefined configuration of the security component; and
providing, to the requesting device, the determined level of access to the protected device.

16. The system of claim 15, wherein providing the determined level of access to the requesting device comprises allowing the requesting device to access a protected device, wherein the protected device is accessible via an unsecured port, and wherein the security component, when installed, is configured to prevent access to the unsecured port, such that the protected device is only accessible via the security component.

17. The system of claim 15, wherein providing, to the requesting device, the one or more attributes comprises determining a physical location of the security component using a global positioning system (GPS), wherein prior to providing the token to the requesting device, the network service determines whether the physical location is within a predefined acceptable area.

18. The system of claim 15, wherein prior to providing the token to the requesting device, the network service compares the one or more attributes to a set of rules associated with the security component.

19. The system of claim 18, wherein a first rule of the set of rules requires the network service to receive approval from an authorized user prior to providing the token.

20. The system of claim 15, wherein the network service records an indication of the transmission from the requesting device, wherein the indication includes: (i) an identity of the requesting device, (ii) an identity of a vendor of the security component, (iii) a serial number of the security component, (iv) a time at which the transmission was received by the network service, and (v) a physical location of the requesting device at the time of the transmission.

* * * * *